3,087,295
LAWN EDGING AND TRIMMING TOOL
Edward L. Grupp, Glendale, Calif.
Filed Mar. 6, 1961, Ser. No. 93,750
4 Claims. (Cl. 56—25.4)

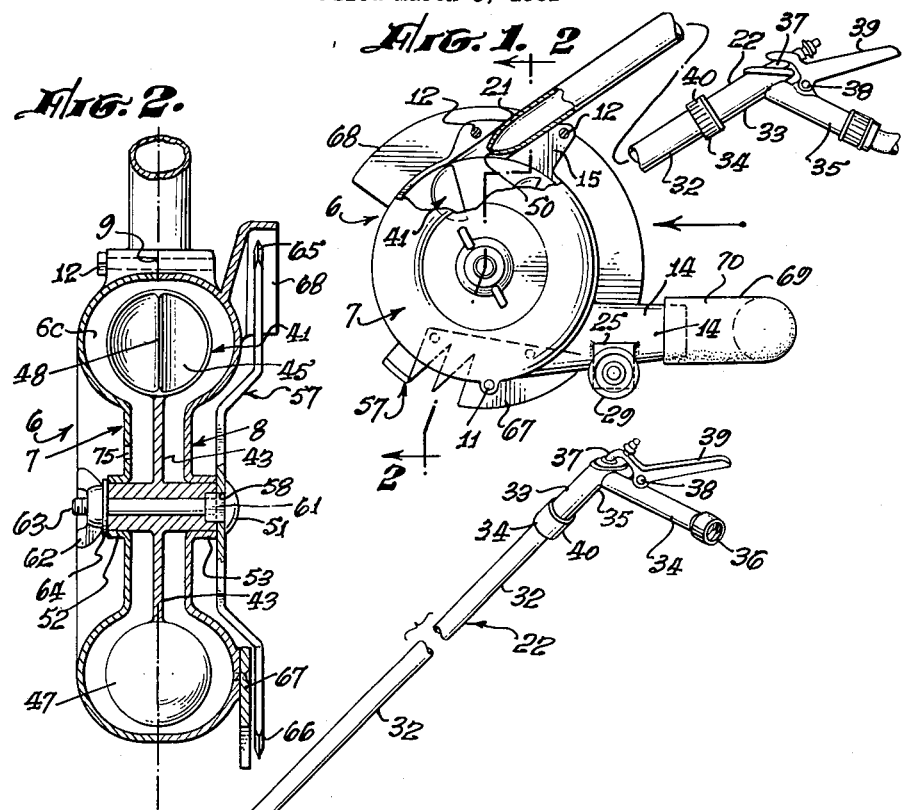

The present invention relates in general to garden and lawn tools and, more particularly, to an improved tool for edging and trimming lawns which is adapted for operation by water power in such a manner that the cutting and trimming blades of the tool are rotated by water supplied by a garden hose while the water discharged from the tool is sprinkled on the lawn. The tool is also adapted in construction and arrangement so that it may be used with different interchangeable blades, thereby extending its range of use beyond that of the conventional lawn edger.

As is well known to home owners who endeavor to care for their own lawns, a plot of grass requires more than mowing and watering in order to have the neat and immaculate appearance normally deriving from the attentions of a professional gardener. Not only must the lawn be cut frequently with a lawn mower, but the lateral growth of the grass by which it tends to spread onto paving and walks and grow into flower beds and foot paths, must also be constantly restrained; and, as is also well known to the non-professional gardener, the problem of trimming and edging a plot of grass is often the most troublesome and time consuming of all.

Efforts of individual inventors and manufacturers to meet this problem have combined to make available to the general market a considerable number of hand operated and motor powered trimming and edging devices. Probably the best known and most widely used of these presently available tools is the hand powered trimming and edging tool often described as a one-wheeled mower, or a half lawn mower, which is provided with small blades to cut vertically growing grass in the conventional manner, and a circular disc which may be employed to cut grass growing laterally beyond the established margins of the plot. This tool, at least with respect to its use as an edger, leaves much to be desired since the disc is often insecurely mounted, is not provided with an adjacent shearing member to cooperate with the cutting disc, and depends for its effectiveness entirely upon the brute force and pressure exerted by the operator.

Some of the shortcomings characterizing the tool just described have been overcome in a recently available edging tool which consists in general of a circular cutting disc rotated by an electric motor. But here again, along with its obvious advantages the electrically driven device presents concomitant difficulties among which are: the provision of suitable electrical outlets and sufficient conductor cable to reach the outer margins of the grass, the ever present chance of burning out the motor by jamming rotation of the disc, the constant fear and actual danger of severe shock by grounding while using the device on moist terrain, and the fact that any conventional driven-disc-type of tool is ordinarily useful only for edging the grass and an additional tool is required for trimming small and inaccessible areas adjoining walls and buildings, trees and other objects. Furthermore, as may be readily understood, an electrically driven device of this character is necessarily expensive not only due to the cost of the motor and cable required, but because of the structure required in the body of the device in order to provide proper and adequate axial support for the motor and cutting disc.

In the foregoing brief discussion of the general art no mention is made of the numerous inexpensive improvisations falling within the gadget category which are alleged to perform certain cutting and trimming functions quickly and effortlessly. All such devices coming within the scope of this applicant's experience, such as discs attached to long handles, grass clippers with remotely operated levers, and the like, are felt to be inadequate if not impractical for the uses ascribed to them.

The present invention has been made with the foregoing considerations in mind and can be said to have a plurality of important objectives.

One important object of the present invention is the provision of a lawn trimming and edging tool adapted in construction so that its moving parts are rotatable by a stream of water from a source under pressure commonly available in domestic water supply.

Another important object of the present invention is the provision of a device of the character described designed so that water used to rotate its grass cutting elements is also sprinkled on the lawn on which the tool is being used, thus conserving water.

A further object of the present invention is the provision of a tool of the character described with means effective to divert water being exhausted in either direction laterally of the tool, permitting the tool to be used close to buildings or the like.

An additional object of the present invention is the provision of a tool of the character described which is adapted for use in cutting laterally extended grass during the lawn edging procedure and which is further provided with alternate cutting means for trimming vertically growing grass immediately adjacent trees, walls and other upright objects.

A still further object of this invention is the provision of a tool of the character described which is provided with means on the handle thereof for varying the flow of water under pressure to the driving element therein for the purpose of stopping or changing the speed of the cutting means.

Another object of the present invention is the provision of a grass cutting tool of the character described which provides with respect to its points of handle attachment and ground contact, favorable leverage to the operator for raising or lowering the cutting blades.

A further object of the invention is the provision of a grass cutting tool of the character described which is designed structurally for inexpensive methods of manufacture, and functionally to provide low maintenance cost, non-hazardous simplicity of operation, and unlimited operability at minimum cost.

These objects are achieved according to my invention by providing a lawn trimming and edging tool that includes a hollow circular casing having water inlet and exhaust openings and bearing portions formed integrally therein, the latter serving to support a single rotor, impulse turbine which rotates interiorly of the casing. Water under normal domestic pressure is directed from a garden hose to the turbine through a tubular handle member which is preferably tapered at its lower end to serve as a nozzle that directs the entire flow and force of the incoming water on the concave cups of the turbine rotor.

Interchangeable cutting blades, for edging and for trimming, are attachable outside the casing to the hub of the turbine rotor, and are suitably keyed for rotation therewith. Wheels are provided to support the casing at the proper distance above the ground, and are attached to the rearward portion of the housing so that they establish a fulcrum or pivotal point relative to which the cutting blades at one side of the casing are tilted downwardly into contact with the grass which is to be cut.

A valve on the upper portion of the handle controls the water supply, and a deflecting tube is fitted rotatably to the exhaust duct so that exhaust water may be sprinkled on the lawn laterally in either direction during operation of the edging tool.

Certain possible variations in the particular embodiment of my invention described herein, and other objects of the invention will become apparent upon examination of the following description and specification of this preferred embodiment and the accompanying drawings, of which:

FIG. 1 is an elevational view of one side of an edging tool constructed in accordance with my invention, with a portion of the casing and the handle broken away to show the relative position of the turbine rotor interiorly of the casing, and the tapered end of the handle through which water is directed into the rotor cups;

FIG. 2 is a vertical sectional view showing the interior structure and arrangement of the tool as seen along the line and in the direction indicated by the arrows 2—2 in FIG. 1;

FIG. 3 is an exploded view in perspective showing all of the major elements and most of the minor parts of the device in their relative positions and order of assembly; and FIG. 4 is an elevational view in perspective showing a grass cutting blade which can be used for trimming the grass in otherwise inaccessible areas, and which can be substituted for the edging blade shown in FIG. 3.

Reference is now made to FIG. 1 showing a complete trimming and edging tool constructed according to my invention, and attention is first directed to the main housing of circular outline, indicated generally by the numeral 6, which includes two mating sections 7 and 8, clearly shown in FIG. 3, which fit together along a vertical plane 9, in the manner best seen in the sectional view in FIG. 2. The housing sections are held together by bolts at the bottom and top seen at 11 and 12 respectively in FIGS. 1 and 2.

Reinforcing boss portions are extended outwardly from the casing section 7 in the manner indicated at 13 at the top and 14 at the bottom in FIG. 3, and similar matching boss portions 15 and 16 are oppositely disposed and extended outwardly from the casing section 8. The pairs 13 and 15, and 14 and 16 being relatively formed and positioned so that when the sections 7 and 8 are bolted together the respective pairs of boss portions come together in matching lateral alinement and their planar facing surfaces abut in the central plane of the casing joint indicated at 9 in FIG. 2.

As is clearly shown in FIG. 3, semi-cylindrical recesses 17 and 18 are formed in the boss portions 15 and 16 of the casing section 8. Similar matching semi-cylindrical recesses are formed in casing section 7. When the casing sections 7 and 8 are bolted together the recesses 17 and 18 combine with oppositely disposed recesses 19 and 20 formed in the boss portions 13 and 14 to form circular ducts opening interiorly of the casing 6 and extending through the casing walls.

The upper duct which is forrmed between the boss portions 13 and 15 is angularly disposed relative to the interior of the casing 6, as can be seen at 17 in FIG. 1, and serves both as the inlet for water under pressure and as socket means in which the lower or inner end 21 of the tubular handle 22 is received and securely clamped when bolts such as 12 are tightened. The housing is thickened at bosses 13 and 15 to clamp the handle 22 firmly in place without distorting the casing. Thus the particular angle of this upper opening is significant since it determines the diagonally upward and rearward slant of the handle 22, and also the angle at which the jet of water and its associated force are directed into the casing 6 against the rotor.

Similarly, when the casing sections 7 and 8 are bolted together, the lower portions 14 and 16, with the recesses 18 and 20 therein, combine to form a water exhaust duct, as seen in FIG. 1.

Generally rectangular bearing blocks as seen at 25 and 26 in FIG. 3, are integrally formed with, and depend downwardly from the boss portions 14 and 16, respectively, and are provided with horizontal bores 27 and 28 adapted to aline axially when the casing sections 7 and 8 are assembled. In this manner a base portion is provided to which the wheels 29 and 30 are individually attached by means of a rivet or bolt 31.

The main handle member, designated generally by the numeral 22, is formed of three tubular sections including a lower shaft section 32 of greatest length, an upper shaft section 33, of lesser length connected to the upper end of section 32 by a coupling ring 40, or other means, and a short section 34 which serves as a hand grip and is connected to the upper sidewall of the upper shaft section 33, and is rigidly attached obliquely thereto by a method adapted to provide a permanent and water tight joint. A hose coupling or fitting 36 is provided at the open end of the grip section 34 spaced from the shaft section 33, and a plunger type valve 37 is pivotally attached at 38 to the grip section 34 so that the valve handle 39, when pressed downwardly or released, swings radially in vertical alinement with the axis of the grip section 34.

The valve mechanism 37-39 is preferred from a safety standpoint, but is optional. The advantage is that the valve is spring biased to a closed position so that if the edging tool is laid down the water supply is cut off when the operator releases his grip on the handle. If desired a hose can be attached directly to tube 32 by means of coupling 40.

Tubular handle section 32 terminates at its lower end in a nozzle 21 having an orifice 50 designed to deliver a small diameter, high velocity jet of water against the rotor described later. Although a separate nozzle member may be employed, I prefer for reasons of simplicity and economy to form the nozzle as an integral tapered part 21 of the handle. This may be formed by a spinning operation, or in any other suitable manner.

As will be understood from FIGS. 1 and 3, depressing the handle 39 of the valve 37 toward parallel alinement with the grip section 34 draws the valve plunger upwardly interiorly of the shaft section 33, thereby permitting water to enter under pressure from the hose at coupling 36 and to flow into the shaft section 33 and thence through the lower shaft section 32 and nozzle 21 into the casing 6. A conventional compression type coil spring, not visible in the drawings, is provided at the pivot point 38 and is effective to raise the handle 39 and close the valve 37 when manual pressure on the handle 39 is removed.

The driving element of the lawn tool of my invention is best described as a single rotor, horizontal shaft, multiple-cup, impulse turbine, a typical example of which is clearly shown in perspective at 41 in the exploded view of FIG. 3, and in vertical section in FIG. 2. In scores of use tests with operative experimental models of my device, rotors of this general type performed very satisfactorily with relation to the ascribed purposes and functions of the device, and either met or exceeded all reasonable requirements relative to speed, power and durability.

As seen in FIG. 3, the preferred type of turbine rotor includes a transverse or axially extending hollow sleeve 42 from which a radial web 43 is extended radially and circumferentially thereof, and a plurality of hollow cups having generally circular openings, spaced equidistantly around the perimeter of the web and all opening in the same direction relative to the rotation of the rotor. As shown in FIG. 3, the rotor 41 is understood to be rotated counterclockwise and the open sides of the cups 45 around the upper half of the rotor are visible, whereas only the closed sides of the cups, around the lower half of the rotor, can be seen. Each of the cups is divided by a central partitioning member such as 48 in the cup 45 in FIG. 2, as is well known in the turbine art. All of the partitioning members 48 in all of the cups aline in the vertical plane of the rotor and preferably coincide with plane 9 of the housing. They are provided for the purpose of dividing the jet stream of water entering a cup, from the orifice 50 of inlet nozzle 21, into two equal streams which, due to the resistance offered by the cup, are turned oppositely and laterally away from the partition 48 and then backwardly and outwardly of the cup because of the concave inner contour of each half of the cup. This reaction contributes to the efficiency of the turbine in two ways: it prevents the water from concentrating in a single mass at the plane of the web 43 where it would interfere with the movement of the rotor; and, by turning the two streams rearwardly, the water is not only removed from the path of the next following cup but the amount of work required to turn the water out and back, results in a substantial increase in effective force impressed upon the cup and rotor by the jet stream.

Attention is directed to the fact that the rotor 41 is preferably not journalled on nor supported by the carriage bolt 51. As can be seen in FIG. 2, a short cylindrical bearing 52 is formed as a part of the casing wall in section 7. A similar bearing 53 is formed in the wall of section 8. These bearings receive the ends of rotor hub 42 and rotatably support the rotor on the casing walls and inside the casing itself.

Bearing 53 on the casing section 8 is alined axially with the bearing 52 on casing section 7 to receive the rotor sleeve 42. Sleeve 42, in turn, is adapted in length so that it extends through the bearings 52 and 53 and slightly outwardly thereof as shown in FIG. 2 so that the clearance space is provided between the casing section 8 and the edging blade 57. Square central apertures are provided in the edging blade 57 as indicated at 58 in FIG. 3, and in the trimming blade 59 as shown at 60 in FIG. 4, and a square recess of similar size is disposed axially in the rotor sleeve 42 at its end spaced from the shoulder 52. Thus when the square section 61 of the shank of bolt 51 is inserted through either of the blades and into the square recess in the rotor shaft, the blade and the rotor are keyed together to rotate as a unit.

When the wing nut 62 is tightened on the threaded end 63 of the carriage bolt 51, washer 64 is forced against the adjacent end of the rotor shaft 42, and since the washer 64 is substantially larger in diameter than the opening in bearing 52 the washer 64 engages the outer face of bearing 52 to hold the shaft and rotor against axial movement. A similar washer is interposed between bearing 53 and blade means 57 to hold the rotor against axial displacement in the other direction.

It will be observed in the sectional view of FIG. 2 that the cross sectional diameter of the enlarged circumferential passageway, indicated by the numeral 6C, through which the rotor cups revolve, is much greater than that of the cups 45 and 47. This area 6C has been made wider than the central section of the casing so as to avoid undue constriction and turbulence during rotation of the rotor, and, in addition to provide space through which the normal flow of water with the rotor turning may reach the outlet 18–20; and also to allow water flow in the event movement of the rotor is prevented by the accidental jamming of the cutting blade.

Details of the edging blade 57 are clearly shown in the perspective view of FIG. 3, and the manner in which its two arcuate circumferential cutting edges 65 and 66 revolve interiorly of the blade guard 68 and adjacent to the comb member 67 will be understood from the sectional view of FIG. 2.

Comb 67 has a plurality of forwardly facing teeth that engage and hold grass being cut to increase the cutting efficiency. The comb is stationary and cooperates with the moving blade 57 to shear grass between them. In addition, the circumferential cutting edges 65 and 66 of the blade cut grass.

Also shown in FIG. 3 is the exhaust water deflecting nozzle 69 which is a right angular tubular section having at one end a straight section 70 which is adapted to fit rotatably around the exhaust duct 18–20 as shown in FIG. 1. The actual exhaust orifice 71 faces laterally of the axis of the sleeve 70, and the nozzle may be swung 180° from one side to the other to direct the exhaust water onto the lawn in the desired direction laterally of the edging tool and and at either side thereof.

Reference is made again to FIG. 4 showing in perspective a typical grass trimming blade 59 which forms a part of the present invention.

Unlike the edging blade 57, the trimming blade 59 has axially extending cutting edges comprising saw toothed cutting elements 72 and 73, which edges are disposed in parallel relationship to the axis of rotation of the blade and consequently perform their cutting function in a plane generally parallel to the ground. As has been previously explained, the purpose of this blade is to cut off vertically growing grass located close to walls, buildings, or other places inaccessible to a conventional mower, and it may be quickly substituted for the edging blade 57 by removing the wing nut 62 and bolt 51.

It will be observed that the edging blade 57 is adapted to rotate in the direction of the arrow, and that the blade 57 is sharpened only along its spaced outer edges 65 and 66 and that the leading edges of the blade such as 75 in FIG. 3, immediately inwardly of the sharpened edge 66 are of the same width as the thickness of the blade itself. This construction has been found to be most efficient when the blade 57 is used in conjunction with a cutting comb 67 since the blunt edges are most effective for the purpose of pressing the laterally disposed blades of grass into and against the shearing teeth of the comb, shown in various positions in FIGS. 1, 2 and 3.

The turbine has been designed to operate on water supplied from the ordinary domestic lines. Usually these water lines supply water at a pressure in the range of 40 to 125 p.s.i. It has been found that a rotor approximately 6" in diameter will achieve a speed of approximately 3500 r.p.m. when water is supplied to the edging tool at a pressure of 40–45 p.s.i. If the supply pressure is increased to 100 p.s.i. the rotational speed of the turbine is approximately doubled, reaching about 7000 r.p.m.

The high rotational speed of the cutting blade makes it very effective in cutting grass. An increase in the torque available can be obtained by making the back sides of the cups thicker than is necessary from a strength viewpoint. The added weight disposed near the perimeter of the rotor gives a fly-wheel effect which is helpful in maintaining the speed of the rotor.

The water from nozzle 21 strikes the open faces of the cups and then flows laterally from the cups into the casing but also flows concurrently with the rotating cups until it reaches the exhaust duct 18–20. This duct is tangential to the path of the moving cups and water stream to effect a smooth exit of the water. At these high speeds the cups move in a partial vacuum over that portion of their path from the water exhaust to nozzle 21, if the housing is not vented. Since this sub-atmospheric pressure reduces the maximum possible speed of the rotor, it is preferred to place one or more air vents 75 in the casing just above the hub of the rotor. These openings maintain atmospheric pressure in the portion of the casing not filled by water and permit a higher rotor speed.

From the foregoing description and specification it will be seen that I have provided through my invention a lawn trimming and edging tool so constructed that its moving parts are rotatable by water under pressure.

It will also be seen from the foregoing that my invention provides a water powered lawn tool adapted in arrangement so that the water used to rotate its cutting elements is deflected laterally in either direction and sprinkled onto the lawn while the tool is being used.

Also to be understood from the foregoing is the fact that I have provided by my invention a dual purpose lawn tool which is adapted for use in cutting laterally extended grass around the outer edges of a lawn, and which is further adapted with alternate cutting means for trimming grass which is growing vertically.

Also apparent from the above description is the fact that the invention provides a water powered lawn tool having valve means for varying the flow of the water which rotates the driving element in the tool for the purpose of stopping or changing the speed of the cutting, and which further includes means for bypassing water under pressure in case the rotation of the cutting and driving elements is suddenly restrained.

It will also be apparent from the above that my invention provides a grass cutting tool which is adapted, with respect to its points of handle attachment and ground contact, so as to give the operator a favorable leverage advantage when exerting pressure upon the tool.

Attention is further directed to the fact that I have provided through my invention a grass cutting tool which is adapted structurally to inexpensive methods of manufacture, and is adapted functionally to provide low maintenence cost and simple, nonhazardous, unlimited operation at no chargeable power cost.

Although for the purpose of the present application I have illustrated and described my invention in the form of a single embodiment, it is to be understood that various changes in the specific construction or relative dimensioning of various elements of lawn trimming and edging devices embodying the improvements of the present invention may be made without departing from the spirit or scope of the invention. Accordingly, it is to be understood that the foregoing specification and description are regarded as being illustrative of, rather than limitative upon, the appended claims.

I claim:

1. In a water-powered grass cutting tool having a casing with a turbine rotor rotatably mounted therein and a grass cutting blade driven by the rotor, the means for delivering a jet stream of water into said casing, comprising:
   a casing comprising two similar halves meeting along a median plane perpendicular to the axis of rotation of said turbine rotor, each half of the casing having a boss with a semi-cylindrical recess and cooperating with the corresponding boss on the other half of the casing to define a cylindrical passage opening into the casing interior and having its axis directed tangentially of the rotor;
   a hollow cylindrical handle for guiding and manipulating the tool and having its lower end insertable into said elongate passage to be gripped between the two bosses, the lower end of the handle terminating in a tapered section forming a nozzle of reduced diameter projecting a stream of fluid issuing from the nozzle against the turbine rotor,
   and means at the other end of the hollow handle for connecting the handle to a source of operating fluid under pressure.

2. In a water-powered grass cutting tool the combination comprising:
   a casing formed in two similar halves meeting along a median plane, each half having a first boss and a second boss at spaced positions around the periphery, the first bosses on the two halves cooperating to form an inlet passage;
   a turbine rotor having peripheral cups and rotatably mounted within the casing to turn about an axis perpendicular to said median plane, the rotor having such a diameter that the axis of the inlet passage is substantially tangent to the rotor;
   grass cutting means mounted externally of the casing;
   means attaching the grass cutting means to the rotor to be rotated thereby;
   a hollow handle clamped in said inlet passage and carrying at one end a nozzle directing a jet of water along the axis of the inlet passage tangentially against the rotor cups;
   and the second bosses on the two casing halves cooperating to form a tangentially rearwardly directed water outlet from the casing.

3. In a water-powered grass cutting tool as claimed in claim 2, the combination that also includes:
   an angular water discharge nozzle rotatably mounted on the casing at said outlet, said nozzle being rotatable to direct the water discharge laterally to either side of the tool.

4. In a water-powered grass cutting tool as claimed in claim 2, the combination in which the median plane is vertical and the interior surface of the casing is substantially symmetrical about the median plane.

References Cited in the file of this patent

UNITED STATES PATENTS

| | | |
|---|---|---|
| 2,867,960 | Stiles et al. | Jan. 13, 1959 |
| 2,924,929 | Albertson et al. | Feb. 16, 1960 |
| 2,934,876 | Perrino | May 3, 1960 |